US008519076B2

(12) United States Patent
Erwin et al.

(10) Patent No.: US 8,519,076 B2
(45) Date of Patent: Aug. 27, 2013

(54) METHOD FOR PRODUCING SOLVENT-FREE UV-CROSSLINKABLE ACRYLATE PRESSURE-SENSITIVE ADHESIVES

(75) Inventors: Jessica Erwin, Hamburg (DE); Klaus Massow, Hamburg (DE); Stephan Zollner, Bucholz/Nordheide (DE)

(73) Assignee: tesa SE, Hamburg (DE)

( * ) Notice: Subject to any disclaimer, the term of this patent is extended or adjusted under 35 U.S.C. 154(b) by 205 days.

(21) Appl. No.: 12/733,000

(22) Filed: Mar. 26, 2010

(65) Prior Publication Data
US 2010/0239778 A1 Sep. 23, 2010

Related U.S. Application Data

(62) Division of application No. 10/557,086, filed as application No. PCT/EP2004/005341 on May 18, 2004, now abandoned.

(30) Foreign Application Priority Data

May 19, 2003 (DE) ................... 103 22 830

(51) Int. Cl.
C08F 2/48 (2006.01)
C08F 2/00 (2006.01)
C08F 2/38 (2006.01)
C08F 2/46 (2006.01)
C08F 118/02 (2006.01)

(52) U.S. Cl.
USPC ............... 526/319; 526/78; 526/82; 526/87; 427/58

(58) Field of Classification Search
USPC ............ 524/319, 22, 236, 556, 543, 560, 524/222; 428/355 R; 522/33; 526/78, 82, 526/87, 319; 427/508
See application file for complete search history.

(56) References Cited

U.S. PATENT DOCUMENTS

| | | | |
|---|---|---|---|
| 4,144,157 A | 3/1979 | Guse et al. | |
| 4,581,429 A | 4/1986 | Solomon et al. | |
| 4,619,979 A | 10/1986 | Kotnour et al. | |
| 5,073,611 A | 12/1991 | Rehmer et al. | |
| 5,510,073 A * | 4/1996 | Kaegi et al. | 264/211.23 |
| 5,789,487 A | 8/1998 | Matyjaszewski et al. | |
| 5,854,364 A | 12/1998 | Senninger et al. | |
| 5,919,871 A | 7/1999 | Nicol et al. | |
| 5,945,491 A | 8/1999 | Matyjaszewski et al. | |
| 6,271,340 B1 | 8/2001 | Anderson et al. | |
| 6,281,311 B1 | 8/2001 | Lai et al. | |
| 6,288,162 B2 * | 9/2001 | Leugs et al. | 524/560 |
| 6,642,318 B1 | 11/2003 | Chiefari et al. | |
| 6,705,753 B2 * | 3/2004 | Behling | 366/85 |
| 6,720,399 B2 * | 4/2004 | Husemann et al. | 526/319 |
| 2002/0019482 A1 * | 2/2002 | Guo et al. | 524/832 |
| 2002/0193539 A1 | 12/2002 | Husemann et al. | |
| 2003/0105258 A1 | 6/2003 | Husemann et al. | |
| 2003/0212238 A1 * | 11/2003 | Weiss et al. | 528/65 |
| 2004/0049002 A1 * | 3/2004 | Andrews et al. | 528/59 |
| 2004/0171777 A1 | 9/2004 | Le et al. | |
| 2005/0143544 A1 | 6/2005 | Husemann et al. | |

FOREIGN PATENT DOCUMENTS

| | | |
|---|---|---|
| DE | 33 05 727 | 8/1984 |
| DE | 36 21 429 | 1/1987 |
| DE | 36 05 003 | 8/1987 |
| DE | 3940954 A1 * | 6/1991 |
| DE | 195 48 136 | 6/1997 |
| DE | 100 30 217 | 1/2002 |
| DE | 100 53 563 | 5/2002 |
| DE | 101 49 084 | 6/2003 |
| DE | 297 24 790 U1 | 4/2004 |
| EP | 0 1 60 394 | 11/1985 |
| EP | 09 43 662 | 9/1999 |
| EP | 1 300 427 | 4/2003 |
| GB | 2177410 | 1/1987 |
| JP | 54-0 56 662 | 5/1979 |
| JP | 6-1 00 605 | 4/1994 |
| WO | 96/24620 | 8/1996 |
| WO | 98/01478 | 1/1998 |
| WO | 98/30601 | 7/1998 |
| WO | 98/44008 | 10/1998 |
| WO | 99/31144 | 6/1999 |
| WO | WO 0211975 A1 * | 2/2002 |

OTHER PUBLICATIONS

English abstract of DE 3940954, Drews, Jun. 1991.*
Makromolekule, Hans-Georg Elias, 5th edition, 1990, Huthig & Wepf Verlag Basle.
Photoinitiation Photopolymerization and Photocuring, Fundamentals and Applications, by J.-P. Fouassier, Hanser Publisher, Munich, Vienna, New York 1995.
Chemistry & Technology of UV & EB Formulation for Coatings, Inks & Paints, vol. 5, A. Carroy, C. Decker, J.J.P. Dowling P. Pappas, B. Monroe, et. by P.K.T. Oldering, publ. by SITA technology, London, England 1994.
Skelhorne "Electron Beam Processing" in vol. 1 "Chemistry & Technology of UV & EB Formulations for Coatings, Inks & Paints" publ. by SITA Technology, London 1991.

* cited by examiner

Primary Examiner — Karuna P Reddy
(74) Attorney, Agent, or Firm — Norris McLaughlin & Marcus, P.A.

(57) ABSTRACT

A UV-crosslinkable polyacrylate pressure-sensitive adhesive composition having a polyacrylate having photoinitiator units incorporated therein by polymerization and being produced by a free-radical solvent-free polymerization process.

13 Claims, No Drawings

METHOD FOR PRODUCING SOLVENT-FREE UV-CROSSLINKABLE ACRYLATE PRESSURE-SENSITIVE ADHESIVES

This is a divisional patent application of U.S. Ser. No. 10/557,086 filed on Nov. 17, 2005, which is 371 of PCT/EP2004/005341 filed 18 May 2004.

The invention relates to a polyacrylate pressure-sensitive adhesive, to methods for producing a pressure-sensitive adhesive of this kind, and to the use of pressure-sensitive adhesives of this kind.

BACKGROUND OF THE INVENTION

For industrial pressure-sensitive adhesive tape applications it is very common to use polyacrylate pressure-sensitive adhesives. Polyacrylates possess a variety of advantages over other elastomers. They are very stable toward UV light, oxygen, and ozone. Synthetic and natural rubber adhesives generally contain double bonds, which render these adhesives unstable to the aforementioned environmental effects. A further advantage of polyacrylates is their transparency and their usefulness across a relatively wide temperature range.

Polyacrylate pressure-sensitive adhesives are generally prepared in solution by means of a free-radical polymerization. The polyacrylates are, generally speaking, coated from solution onto the corresponding carrier material, via a coating bar, and subsequently dried. To increase the cohesion the polymer is crosslinked. Curing proceeds thermally or by UV crosslinking or by EB curing (EB: electron beams). The operation described is relatively cost-intensive and environmentally objectionable, since as a general rule the solvent is not recycled, and a high level of consumption of organic solvents implies a high environmental burden.

Furthermore, it is very difficult to produce pressure-sensitive adhesive tapes at high application rate without bubbles.

Remediation of these drawbacks is implied by the hotmelt process. Here, the pressure-sensitive adhesive (PSA) is applied from the melt to the carrier material.

This new technology, however, also entails restrictions. Prior to coating, the solvent is removed from the PSA, which additionally is prepared in solution, in a drying extruder. The drying operation is associated with a relatively high temperature and shearing exposure, so that high molecular weight polyacrylate PSAs in particular are significantly damaged. The acrylate PSA undergoes gelling or the low molecular weight fraction is sharply enriched as a result of molecular weight reduction. Both effects are unwanted, since they are deleterious for the application. Either the adhesive can no longer be coated, or its technical adhesive properties are altered.

One solution for lessening these drawbacks is offered by polyacrylate adhesives having a low average molecular weight and a narrow molecular weight distribution. Here, the fraction of low molecular weight and high molecular weight molecules in the polymer is sharply reduced as a result of the polymerization process. The disappearance of the high molecular weight fractions lowers the flow viscosity, and the composition shows less of a tendency to gel. As a result of the lowering of the low molecular weight fraction, there is a reduction in the number of oligomers, which reduce the shear strength of the PSA.

For producing low molecular weight PSAs a variety of polymerization methods are suitable. State of the art is the use of regulators, such as, for example, alcohols or thiols (Makromoleküle, Hans-Georg Elias, 5th edition, 1990, Hüthig & Wepf Verlag Basle). These regulators reduce the molecular weight but broaden the molecular weight distribution.

A further controlled polymerization method used is that of atom transfer radical polymerization, ATRP. The various possibilities of ATRP are described in U.S. Pat. No. 5,945,491 A, U.S. Pat. No. 5,854,364 A and U.S. Pat. No. 5,789,487 A. Generally speaking, metal catalysts are used, a side-effect of which is a negative influence on the aging of the PSAs (gelling, transesterification). Moreover, the majority of metal catalysts are toxic, discolor the adhesive, and can be removed from the polymer only by means of costly and inconvenient precipitations.

U.S. Pat. No. 4,581,429 A discloses a controlled free-radical polymerization process. The process employs as its initiator a compound of the formula R'R"N—O—X, in which X represents a free radical species which is able to polymerize unsaturated monomers. The conversion rates of the reactions, however, are generally low. A particular problem is the polymerization of acrylates, which proceeds only at very low yields and molecular weights.

WO 96/24620 A, WO 98/30601 A, and WO 98/4408 A describe further polymerization methods in which regulating substances are used to prepare polymers having low polydispersities. Disadvantages of these methods include the low conversion and the use of solvents.

In the aforementioned patents or papers an attempt is made to improve the control of free-radical polymerization reactions. There exists, nevertheless, a need for a nitroxide-controlled polymerization method which is highly reactive and with which high conversions are achievable in conjunction with high molecular weight and low polydispersity.

Another version is the RAFT process (Reversible Addition-Fragmentation Chain Transfer). The process is described at length in WO 98/01478 A and WO 99/31144 A, but in the manner depicted therein is not suitable for the production of PSAs, since the conversions achieved are very low and the average molecular weight of the polymers produced is too low for acrylate PSAs. Hence the polymers described cannot be used as acrylate PSAs. An improvement is achieved with the process described in DE 100 30 217 A.

Neither the method according to the RAFT process nor the use of nitroxide compounds, however, can be employed for UV crosslinking, since the compounds disclosed possess a radical scavenger effect, so that the crosslinking efficiency following addition of the free UV photoinitiator is too low.

Guse (U.S. Pat. No. 4,144,157 A) describes a process in which the acrylate PSAs are readily UV-crosslinkable and can be processed as a hotmelt, and yet, owing to the broad molecular weight distribution, they do not possess good technical adhesive properties. A further disadvantage is that these PSAs are also produced by solution polymerization with subsequent removal of solvent.

Commercially, low molecular weight acrylate hotmelts are offered in which benzophenone derivatives or acetophenone derivatives have been incorporated as an acrylated photoinitiator into the acrylate polymer chain. They can then be crosslinked with UV-radiation (see also U.S. Pat. No. 5,073,611 A). The shear strength achievable with such systems, however, is not satisfactory, since for a relatively low molecular weight ($M_w$ (weight average) about 250 000 g/mol) these systems have a relatively broad distribution. A great disadvantage of these systems, moreover, is that they still contain measurable fractions of residual solvent and hence are not solvent-free.

An improvement to acrylate PSAs in connection with their processing by the hotmelt method and subsequent UV crosslinking is achieved through the production of narrow-distribution acrylate PSAs with copolymerized photoinitiators—as set out in DE 101 49 084 A. The use of copolymerized photoinitiators significantly increases the crosslinking efficiency as compared with the use of promoters which promote UV crosslinking and are not added until after the polymerization. With this method, however, the polymerization still takes place in solution and the polymer melt is produced only by concentration down to a residual solvent content of <2%. The environmental and also economic problem described at the outset, namely the high level of consumption of organic solvents, is therefore not solved here either. A further factor is that possible solvent residues in the adhesive can lead to odor nuisance in the course of subsequent use.

A solventless method for producing polyacrylates in a twin-screw extruder is described in EP 0 160 394 A. However, the acrylate hotmelt PSAs produced by that method have a high gel fraction, in some cases considerably so, of up to 55%, thereby severely impairing their further processing. Since, here as well, UV crosslinking is only possible through subsequent addition of promoters, the crosslinking efficiency, too, is low.

The central problem which therefore remains is the production of solvent-free acrylate PSAs with an efficient UV crosslinking.

It is an object of the invention, therefore, to provide a method for producing a solvent-free polyacrylate composition which can be processed very effectively by the hotmelt method and thereafter is very effectively crosslinkable, and also to provide the resultant acrylate hotmelt PSAs, which does not have the drawbacks of the cited prior art, or has them only to a reduced extent.

SUMMARY OF THE INVENTION

The invention accordingly provides a method for producing a UV-crosslinkable solvent-free polyacrylate pressure-sensitive adhesive which possesses an average molecular weight $M_w$ (weight average) of 100 000 to 3 000 000 g/mol and also possesses copolymerized photoinitiator units.

The polyacrylate PSAs are produced by way of a free-radical solvent-free polymerization operation.

In one advantageous development of the polyacrylate PSA it has an average molecular weight $M_w$ (weight average) of 100 000 to 800 000 g/mol and a polydispersity of not more than 4.0 and also possesses these copolymerized photoinitiator units.

The production of the polyacrylate PSAs having a polydispersity of not more than 4.0 is accomplished by way of a free-radical solvent-free polymerization operation in a planetary roller extruder in which a polymer is prepared from a monomer mixture, the monomer mixture for polymerization comprising copolymerizable photoinitiators and the polymerization operation being regulated in particular by the presence of at least one chemical compound containing the unit

as polymerization regulator, X being S, O or N.

Polymerization regulators which can be used with great advantage for the purposes of the invention include trithiocarbonates or dithioesters.

Surprisingly it has been found that through polymerization in a planetary roller extruder, when using copolymerizable photoinitiators, the latter are copolymerized in such a way that it is possible to produce solvent-free polyacrylate hotmelt PSAs which can be crosslinked very efficiently by UV radiation.

DETAILED DESCRIPTION

The present invention therefore relates, among other things, to a method for producing solvent-free UV-crosslinkable polyacrylate pressure-sensitive adhesives. The method is also notable for the fact that the preparation of the polymer takes place by means of solvent-free polymerization, the monomer mixture possessing copolymerizable photoinitiators.

The use of copolymerizable photoinitiators during the solvent-free polymerization produces a polymer which can be very efficiently crosslinked by UV radiation. The polymers prepared by such a method coat very well and are notable not only for the high UV crosslinking efficiency but also for their extremely low odor intensity. They are suitable, consequently, for producing adhesive tapes which can be used even under high shearing load. An adhesive tape coated with the adhesive of the invention possesses, moreover, no solvent residues, as is the case with adhesive tapes produced by the conventional method. Commercially available UV-crosslinkable acrylate hotmelt PSAs, for example, still include a certain residual solvent fraction. By means of the method of the invention it is possible, then, to produce adhesive tapes which contain no solvent.

It has been found that the solvent-free production of a UV-crosslinkable polyacrylate hotmelt PSA is possible with advantage in an extruder. The planetary roller extruder, in particular, has proven suitable for such a method. Polymerization in the planetary roller extruder has the advantage that the tendency to form gel is substantially lower than in, say, a twin-screw extruder; particularly when using regulator substances and copolymerizable photoinitiators, a particularly low propensity to form gel is observed. This results in narrow-distribution polyacrylate hotmelt PSAs having very good further-processing properties, which are crosslinkable, furthermore, very efficiently by UV crosslinking.

Owing to the customarily short residence time in the case of polymerizations in the planetary roller extruder, there was no possibility of predicting that the copolymerizable photoinitiator would be copolymerized in the course of the solvent-free polymerization to an extent necessary for crosslinking. Surprisingly, even in the case of combined use of copolymerizable photoinitiators and regulator substances, highly UV-crosslinkable polyacrylate hotmelt PSAs were produced during polymerization in the planetary roller extruder. A reason why this could not have been predicted was that this combined use of the aforementioned substances in a conventional solution polymerization in a stirred tank leads to a massive reduction in reaction rate.

It has been found that specifically the combination of the use of regulator substances with copolymerizable photoinitiator in polymerizations in a planetary roller extruder leads to UV-crosslinking adhesives which are possessed of particularly good coatability.

The low polydispersity leads to advantages associated with the polymerization in the planetary roller extruder, thereby boosting the outstanding mixing properties which are a feature of a planetary roller extruder. The use of regulator substances results in polymers having a low polydispersity, which has advantageous consequences for the solvent-free polymerization. The viscosity, which plays a decisive part particularly in the case of solvent-free polymerization, is moved, as a result of the low polydispersity, into a range which is advantageous for solvent-free polymerization. Greater polydispersity is accompanied by an increase likewise in the viscosity, which reduces the possibilities of the heat removal and also reduces the mixing action in the reactor. These properties are of decisive importance for the reliable implementation of solvent-free polymerizations. Additionally, as a result of the positive effect of polydispersity on viscosity, a higher conversion rate is possible, and, too, the propensity to form gel is reduced as a result, which in turn is important for the use of the adhesive as a hotmelt PSA.

The planetary roller extruder is suitable in particular by virtue of its outstanding thermal characteristics and also by virtue of the extraordinarily diverse possibilities of temperature control for this solvent-free polymerization.

The extruder used is preferably operated continuously. Partial recycling of the product stream, referred to as loop operation, may also be advantageous. The most advantageous is to produce a solvent-free UV-crosslinkable polyacrylate PSA in a hydraulically filled planetary roller extruder. Hydraulic filling simplifies the observance of oxygen-free conditions and also the best-possible utilization of the extruder section. Moreover, phase boundaries are avoided, which can have disruptive consequences for the polymerization operation.

The monomers can be metered to the polymerization reactor either individually or as a mixture. Preliminary mixing, particularly of the copolymerizable photoinitiator, ensures a uniform distribution of the reaction mixture. Also possible in principle, however, is mixing in the reactor or by bringing together different starting-material streams in an upstream continuous mixer, which is operated dynamically or which may be a static mixer or a micromixer.

The addition of further substances such as initiators, polymerization regulators and further monomers, for example, to the starting-material stream along the length of the reactor may be sensible. When using a planetary roller extruder composed of a plurality of roller barrels in series, additions of this kind may be made via holes drilled in the connecting flanges of the roller barrels.

With subsequent metering of suitable initiators or initiator mixtures it is possible to achieve high conversion rates without at the same time inducing—as a result of a high primary-radical concentration—low molecular weights or instances of gelling of the polymer.

In one development of the method the polymer, following polymerization in the planetary roller extruder, is removed from constituents which are still volatile, such as unreacted monomers, in a devolatilizing extruder. These constituents, after a determination of their composition, may be fed back to the starting-material stream.

In another development of the method the polymer, following polymerization and, where necessary, devolatilizing and, where appropriate, the addition of one or more of the additives—which addition may take place in the polymerization extruder and/or in a downstream compounding extruder—is coated from the melt, advantageously gel-free, onto a carrier ("gel-free" denotes compliance with the requirements for coatability of the compositions using the coating apparatus which is commonly employed and which is familiar to the skilled worker for these purposes; in particular, for a coatability which is distinguished by a uniform (homogeneous) coating pattern with no inhomogeneities or streaks when coating takes place through the commonly used coating nozzles or by means of a roll applicator).

It is then advantageous to crosslink the polymer by means of UV radiation, this taking place, in particular, following coating onto the carrier. In this case it is preferred to proceed in such a way that the UV crosslinking is assisted by the added polymerization regulator.

In summary, the following scheme can be compiled for an advantageous procedure:
Polymerization operation of a monomer mixture containing, in addition to (meth-)acrylic acid-based monomers, copolymerizable photoinitiators,
the polymerization taking place in a solvent-free operation, which is possible through the use of a planetary roller extruder.
As a result of the use of a control reagent, polydispersities of 1.2 to 4 are achieved.
The polymerization operation may be followed by a devolatilizing operation.
The polymer can be further-processed directly. Solvent recycling is unnecessary.
The polymer is coated gel-free from the melt, and
after coating is crosslinked with UV light, the added regulator assisting and accelerating the UV crosslinking.

The UV-crosslinking polyacrylate PSA and the narrow-distribution, UV-crosslinking polyacrylate PSA are composed preferably of the following monomers
a) acrylic esters and/or methacrylic esters and/or the free acids thereof, with the following formula $CH_2=CH(R_i)(COOR_2)$,
where $R_1=H$ or $CH_3$ and $R_2$ is an alkyl chain having 1 to 30 carbon atoms or H, at 70% to 99.9% by weight, in particular 75% to 99.5% by weight,
b) UV photoinitiator having a free-radically polymerizable double bond
at 0.1% to 2% by weight, in particular 0.4% to 1% by weight,
c) if desired, olefinically unsaturated monomers having functional groups, at 0 to 30% by weight.

In one very preferred version the monomers a) used include acrylic monomers which comprise acrylic and methacrylic esters having alkyl groups consisting of 4 to 14 carbon atoms, preferably 4 to 9 carbon atoms. Specific examples, without wishing to be restricted unnecessarily by this enumeration, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and their branched isomers, such as 2-ethylhexyl acrylate, for example. Further classes of compound which can likewise be added in small amounts under a) are methyl methacrylates, cyclohexyl methacrylates, and isobornyl methacrylates.

In one very preferred version photoinitiators with at least one vinyl compound are used for the monomers b). The photoinitiators may be of the Norrish I or Norrish II type.

The photoinitiators include as a building block, preferably, one or more of the following radicals:
Benzophenone-, acetophenone-, benzil-, benzoin-, hydroxy-alkylphenone-, phenyl cyclo-hexyl ketone-, anthraquinone-, trimethylbenzoylphosphine oxide-, methylthiophenyl morpholine ketone-, amino ketones-, azobenzoins, thioxanthone-, hexarylbisimidazole-, triazine-, or fluorenone, it being possible for each of these radicals additionally to be substituted by one or more halogen atoms and/or one or more alkoxy groups and/or one or more amino groups and/or hydroxyl groups. A representative overview is given in "Photoinitiation Photopolymerization and Photocuring, Fundamentals and Applications, by J.-P. Fouassier, Hanser Publishers, Munich, Vienna, N.Y. 1995". For supplementation it is possible to consult "Chemistry & Technology of UV & EB Formulation for Coatings, Inks & Paints, volume 5, A. Carroy, C. Decker, J. P. Dowling, P. Pappas, B. Monroe, ed. by P. K. T. Oldring, publ. by SITA Technology, London, England 1994".

Specific examples, without wishing to be restricted unnecessarily as a result, are acrylated benzophenone, such as Ebecryl P 36™ from UCB, for example, or benzoin acrylate.

In one very preferred version monomers c) used include vinyl esters, vinyl ethers, vinyl halides, vinylidene halides, vinyl compounds with aromatic rings and heterocycles in α-position. Here again, non-exclusive mention may be made of some examples: vinyl acetate, vinyl formamide, vinyl pyridine, ethyl vinyl ether, vinyl chloride, vinylidene chloride and acrylonitrile. In one further very preferred version for the monomers c) monomers having the following functional groups are employed: hydroxyl, carboxyl, epoxy, acid amide, isocyanato or amino groups.

In one advantageous version acrylic monomers are used for c) that conform to the following general formula

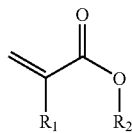

where $R_1$=H or $CH_3$ and the radical —$OR_2$ represents or includes the functional group and, for example, in one particularly preferred version, possesses an H-donor effect, which facilitates the UV crosslinking.

Particularly preferred examples for component c) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide, and glyceridyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl) acrylamide, N-isopropylacrylamide, vinylacetic acid, tetrahydrofufuryl acrylate, β-acryloyloxypropionic acid, trichloroacrylic acid, fumaric acid, crotonic acid, aconitic acid, and dimethylacrylic acid; this enumeration should not be understood as exhaustive.

In one further preferred version aromatic vinyl compounds are used for component c), the aromatic nuclei consisting preferably of $C_4$ to $C_{18}$ and also being able to contain heteroatoms. Particularly preferred examples are styrene, 4-vinylpyridine, N-vinylphthalimide, methylstyrene, 3,4-dimethoxystyrene, and 4-vinylbenzoic acid; this enumeration should likewise not be understood as exhaustive.

For the polymerization the monomers are chosen such that the resultant polymers can be employed as industrially useful PSAs, particularly such that the resulting polymers possess pressure-sensitive adhesion properties in accordance with the "Handbook of Pressure Sensitive Adhesive Technology" by Donatas Satas (van Nostrand, N.Y. 1989). For these applications the static glass transition temperature of the resultant polymer is advantageously below 25° C.

For preparing the narrow-distribution polymers the polymerization is carried out preferably using a control reagent of the general formula:

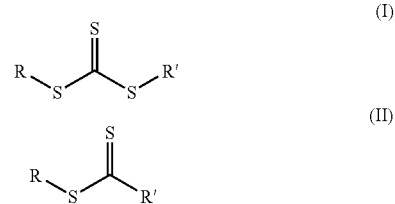

in which R and R' are chosen independently of one another or are the same, and which come from the following list:
branched and unbranched $C_1$ to $C_{18}$ alkyl radicals; $C_3$ to $C_{18}$ alkenyl radicals; $C_3$ to $C_{18}$ alkynyl radicals
H or $C_1$ to $C_{18}$ alkoxy
$C_3$ to $C_{18}$ alkynyl radicals; $C_3$ to $C_{18}$ alkenyl radicals; $C_1$ to $C_{18}$ alkyl radicals substituted by at least one OH group or one halogen atom or one silyl ether;
$C_2$-$C_{18}$ hetero-alkyl radicals having at least one oxygen atom and/or one NR' group in the carbon chain
$C_3$-$C_{18}$ alkynyl radicals, $C_3$-$C_{18}$ alkenyl radicals, $C_1$-$C_{18}$ alkyl radicals substituted by at least one ester group, amine group, carbonate group, cyano, isocyanato and/or epoxide group and/or by sulfur;
$C_3$-$C_{12}$ cycloalkyl radicals
$C_6$-$C_{18}$ aryl or benzyl radicals
hydrogen
Control reagents of type (I) consist in a more preferred version of the following compounds.

Halogens in this case are preferably F, Cl, Br or I, more preferably Cl and Br. As alkyl, alkenyl, and alkynyl radicals in the various substituents outstanding suitability is possessed by both linear and branched chains.

Examples that may be mentioned of alkyl radicals containing 1 to 18 carbon atoms include methyl, ethyl, propyl, isopropyl, butyl, isobutyl, tert-butyl, pentyl, 2-pentyl, hexyl, heptyl, octyl, 2-ethylhexyl, tert-octyl, nonyl, decyl, undecyl, tridecyl, tetradecyl, hexadecyl and octadecyl.

Examples of alkenyl radicals having 3 to 18 carbon atoms are propenyl, 2-butenyl, 3-butenyl, isobutenyl, n-2,4-pentadienyl, 3-methyl-2-butenyl, n-2-octenyl, n-2-dodecenyl, isododecenyl, and oleyl.

Examples of alkynyl having 3 to 18 carbon atoms are propynyl, 2-butynyl, 3-butynyl, n-2-octynyl, and n-2-octadecynyl.

Examples of hydroxy-substituted alkyl radicals are hydroxypropyl, hydroxybutyl or hydroxyhexyl.

Examples of halogen-substituted alkyl radicals are dichlorobutyl, monobromobutyl or trichlorohexyl.

A suitable $C_2$-$C_{18}$ hetero-alkyl radical having at least one oxygen atom in the carbon chain is, for example, —$CH_2$—$CH_2$—O—$CH_2$—$CH_3$.

Examples of radicals serving as $C_3$-$C_{12}$ cycloalkyl radicals include cyclopropyl, cyclopentyl, cyclohexyl or trimethylcyclohexyl.

Examples of radicals serving as $C_6$-$C_{18}$ aryl radicals include phenyl, naphthyl, benzyl, 4-tert-butylbenzyl- or further substituted phenyl, such as, for example, ethylphenyl, toluene, xylene, mesitylene, isopropylbenzene, dichlorobenzene or bromotoluene.

The above lists serve only as examples of the respective groups of compound and possess no claim to completeness.

Furthermore, compounds of the following types are also suitable as control reagents

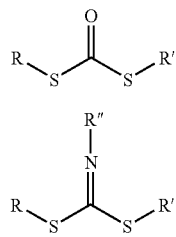

(III)

(IV)

where R" can embrace the aforementioned radicals R or R', independently of the choice thereof.

In one particularly preferred embodiment of the invention compounds (Ia) and (IIa) are used as control reagents.

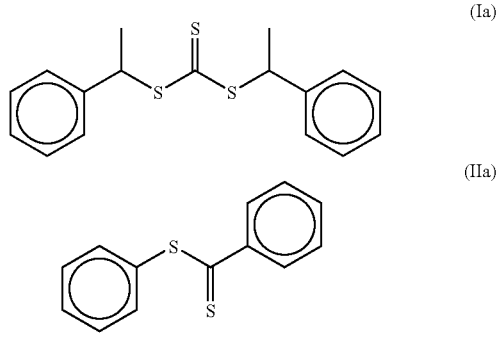

(Ia)

(IIa)

In connection with the abovementioned polymerizations which proceed by a controlled-growth free-radical mechanism it is preferred to use initiator systems which additionally contain further free-radical initiators for the polymerization, especially thermally decomposing free-radical-forming azo or peroxo initiators. Suitable in principle for this purpose, however, are all customary initiators that are known for acrylates. The production of C-centered radicals is described in Houben Weyl, Methoden der Organischen Chemie, vol. E 19a, pages 60 to 147. These methods are preferentially employed analogously.

Examples of free-radical sources are peroxides, hydroperoxides, and azo compounds; as a number of nonexclusive examples of typical free-radical initiators, mention may be made here of potassium peroxodisulfate, dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate, and benzpinacol. In one very preferred version the free-radical initiator used is 2,2'-azobisisobutyronitrile (Vazo 64™ from DuPont).

The average molecular weights $M_w$ (weight averages) of the polymers formed in the controlled free-radical polymerization are chosen such that they are situated within a range of 100 000 and 800 000 g/mol; specifically for further use as hotmelt PSAs, PSAs are produced which have average molecular weights (weight averages) $M_w$ of 100 000 to 350 000 g/mol. The average molecular weight $M_w$ is determined in each case via size exclusion chromatography (gel permeation chromatography, GPC) or matrix-assisted laser-desorption/ionization coupled with mass spectrometry (MALDI-MS).

The polymerization takes place in bulk without addition of solvents.

For initiating the polymerization it is essential, for the thermally decomposing initiators, to introduce heat. For the thermally decomposing initiators the polymerization can be initiated by heating to 50 to 160° C., depending on initiator type.

In one further advantageous development one or more plasticizers are metered in to the polyacrylates, such as, for example, low molecular weight polyacrylates, phthalates, phosphates, citrates, and water-soluble plasticizers (whale oil plasticizers).

The polyacrylates may further be blended with one or more additives such as aging inhibitors, light stabilizers, ozone protectants, fatty acids, nucleators, expandants, compounding agents and/or accelerants. With regard to the aging inhibitors, reference may be made in particular to primary and secondary aging inhibitors, which are available commercially under the tradenames Irganox™ from Ciba Geigy and Hostanox™ from Clariant.

The invention also provides for the particularly preferred use of the polyacrylate pressure-sensitive adhesive for an adhesive tape, it being possible for the polyacrylate pressure-sensitive adhesive to have been applied to one or both sides of a carrier.

Carrier materials used for the PSA, for adhesive tapes for example, are the customary materials familiar to the skilled worker, such as films (polyesters, PET, PE, PP, BOPP, PVC), nonwovens, foams, woven fabrics, and woven films, and also release paper (glassine, HDPE, LDPE). This enumeration should likewise not be understood as exhaustive.

Particularly for use as a PSA it is advantageous for the inventive method if the polyacrylate (the resultant polymer) is applied, preferably inline, to a carrier or to a carrier material, in the form of a layer.

For the PSA utility it is particularly advantageous to crosslink the polyacrylates after they have been coated onto the carrier or onto the carrier material. For producing the PSA tapes the above-described polymers are for this purpose blended, optionally, with crosslinkers. Preferred substances in accordance with the inventive method that crosslink under radiation are, for example, difunctional or polyfunctional acrylates or difunctional or polyfunctional urethane acrylates, difunctional or polyfunctional isocyanates or difunctional or polyfunctional epoxides. Here, however, it is also possible to use all further difunctional or polyfunctional compounds, familiar to the skilled worker, which are capable of crosslinking polyacrylates.

To improve the crosslinking efficiency it is possible if desired to blend the polyacrylates with further, noncopolymerized photoinitiators. Suitable for this purpose are, preferably, Norrish type I and type II cleaving compounds, a number of possible examples of both classes being benzophenone derivatives, acetophenone derivatives, benzil derivatives, benzoin derivatives, hydroxyalkylphenone derivatives, phenyl cyclohexyl ketone derivatives, anthraquinone derivatives, thioxanthone derivatives, triazine derivatives, or fluorenone derivatives, this enumeration possessing no claim to completeness. A representative overview is given, again, in "Photoinitiation Photopolymerization and Photocuring, Fundamentals and Applications, by J.-P. Fouassier, Hanser Publishers, Munich, Vienna, N.Y. 1995" and "Chemistry & Technology of UV & EB Formulation for Coatings, Inks & Paints, volume 5, A. Carroy, C. Decker, J. P. Dowling, P. Pappas, B. Monroe, ed. by P. K. T. Oldring, publ. by SITA Technology, London, England 1994".

UV crosslinking takes place very preferably by means of brief ultraviolet irradiation in a wavelength range from 200 to 450 nm, particularly using high-pressure or medium-pressure mercury lamps with an output of 80 to 240 W/cm. For UV crosslinking it is also possible, however, to use monochromatic radiation in the form of lasers. In order to prevent instances of overheating it may be appropriate to shade off part of the UV beam path. Furthermore, it is possible to use special reflector systems which function as cold light emitters in order thus to prevent instances of overheating.

It can be appropriate to crosslink the inventively described polyacrylates additionally using electron beams. Typical irradiation equipment that can be employed includes linear cathode systems, scanner systems and/or segmented cathode systems, where the devices in question are electron beam accelerators.

An exhaustive description of the state of the art and of the most important process parameters is found in Skelhorne "Electron Beam Processing" in vol. 1 "Chemistry & Technology of UV & EB Formulations for Coatings, Inks & Paints" publ. by Sita Technology, London 1991. The typical acceleration voltages are situated in the range between 50 kV and 500 kV, preferably 80 kV to 300 kV. The radiation doses employed range between 5 to 150 kGy, in particular 20 to 100 kGy.

EXAMPLES

Practical Implementations

Implementation of Polymerization (Method A):

The polymerization was implemented using as reactor a planetary roller extruder consisting of three roller barrels in series. The roller barrels used have a roller diameter D of 70 mm and were equipped with 7 planetary spindles. Both central spindle and roller barrels are fitted with separate temperature-control circuits. The temperature-control medium used was pressurized water.

For the polymerization the reactor is operated continuously. Prior to the beginning of metering the reactor is flushed with nitrogen for 1 hour. A mixture is produced from monomers and initiator. This initial mixture is rendered inert by nitrogen being passed through it. By means of a pump, the reaction mixture is conveyed through a static mixer, which is fitted with further feed devices, and then through a heat exchanger into the reactor. The reaction mixture is added continuously to the reactor via a hole drilled at the beginning of the first roller barrel. Located at the exit from the reactor is a valve by means of which the hydraulic filling of the reactor is ensured.

The heat exchanger for feed preheating, central spindle, and roller barrels are controlled with the particular desired temperatures. In the case of the central spindle a temperature of 80° C. was set; the medium for feed preheating was set at 90° C. Roller barrels 1 and 3 were controlled to 100° C., roller barrel 2 to 95° C.

The speed of the central spindle was 50 revolutions per minute. The hydrodynamic residence time was 15 minutes. Following emergence from the reactor, a sample is taken to determine the conversion. Subsequently, volatile constituents still present are removed in a devolatilizing extruder.

Production of Swatch Specimens (Method B):

The adhesive is coated at an application rate of 50 g/m$^2$ via a hotmelt coater having two heatable rolls onto a Saran-primed PET film 23 μm thick.

UV Irradiation (Method C)

UV irradiation was carried out using a UV unit from Eltosch. The unit is equipped with a medium-pressure Hg UV lamp having an intensity of 120 W/cm. The swatch specimens produced by method B were each run through the unit at a speed of 20 m/min, the specimens being irradiated in a plurality of passes in order to increase the irradiation dose. The UV dose was measured using the Power Puck from Eltosch. The dose of one irradiation pass was approximately 140 mJ/cm$^2$ in the UV-B range and 25 mJ/cm$^2$ in the UV-C range.

Preparation of 2,2'-bis(phenylethyl)thiocarbonate 2,2'-Bis(phenylethyl) thiocarbonate is synthesized starting from 2-phenylethyl bromide with carbon disulfide and sodium hydroxide in accordance with instructions from Synth. Communications 18(13), pp. 1531-1536, 1988. Yield after distillation: 72%.

Characterization: $^1$H NMR (CDCl$_3$) δ (ppm): 7.20-7.40 (m, 10H), 1.53, 1.59 (2×d, 6H), 3.71, 3.81 (2×m, 2H).

Photoinitiators

The copolymerizable photoinitiator used was benzoin acrylate.

Test Methods

The following test methods were employed to evaluate the properties of the polymers and of the PSAs produced.

Determination of Conversion (Test A)

The conversion rate was determined by gravimetry and is expressed as a percentage in relation to the amount by weight of monomers employed. To isolate the polymer it is dried in a vacuum cabinet. The weight of the polymer is weighed and divided by the initial mass of monomers employed. The calculated value corresponds to the percentage conversion.

Gel Permeation Chromatography GPC (Test B)

The average molecular weight $M_w$ and the polydispersity PD were determined by gel permeation chromatography. The eluent used was THF containing 0.1% by volume trifluoroacetic acid. Measurement took place at 25° C. The precolumn used was PSS-SDV, 5μ, 10$^3$ Å, ID 8.0 mm×50 mm. Separation was carried out using the columns PSS-SDV, 5μ, 10$^3$ and also 10$^5$ and 10$^6$ each with ID 8.0 mm×300 mm. The sample concentration was 4 g/l, the flow rate 1.0 ml per minute. Measurement was carried out against PMMA standards.

Determination of the Gel Fraction (Test C)

The carefully dried, solvent-free samples of adhesive are welded into a polyethylene web pouch (Tyvek nonwoven). For the determination of the gel index after UV crosslinking a defined area of the swatch specimen produced is welded into a polyethylene flow pouch (Tyvek nonwoven). From the difference in the sample weights before extraction and after extraction with toluene a determination is made of the gel index—that is, the toluene-insoluble weight fraction of the polymer.

The following test methods were employed to evaluate the technical adhesive properties of the PSAs produced.

Shear Strength (Test D)

A strip of the adhesive tape, 13 mm wide, was applied to a smooth steel surface which had been cleaned three times with acetone and once with isopropanol. The area of application measured 20 mm×13 mm (length×width). Subsequently the adhesive tape was pressed onto the steel support four times using a 2 kg weight. At room temperature (RT) a 1 kg weight was affixed to the adhesive tape, and a measurement was made of the time taken for the weight to drop off.

The holding power times (HP) measured are reported in minutes and correspond to the average from three measurements.

180° Bond Strength Test (Test E)

A strip 20 mm wide of an acrylate PSA applied as a layer to polyester was applied to steel plates. The PSA strip was pressed onto the substrate twice using a 2 kg weight. The adhesive tape was subsequently peeled from the substrate immediately at 300 mm/min and at an angle of 180°. The steel plates were washed twice with acetone and once with isopropanol. The measurement results are reported in N/cm and are averaged from three measurements. All measurements were carried out at room temperature.

EXAMPLES

Example 1

Broad $M_w$ Distribution; High Molar Mass; UV Crosslinking without UV Initiator

A polymer was prepared by method A. 5% of acrylic acid, 95% of n-butyl acrylate and 0.015% of azoisobutyronitrile (AIBN, Vazo 64™, DuPont) were used.

The average molecular weight and the polydispersity were determined by means of test B, the conversion by test A, and the gel index by test C.

Subsequently a swatch sample was produced by method B and was UV-irradiated by method C.

The specimen was tested in accordance with tests C, D and E.

Example 2

Narrow $M_w$ Distribution; Low Molar Mass; UV Photoinitiator

A polymer was prepared by method A. 4.5% of acrylic acid, 95% of n-butyl acrylate, 0.5% of benzoin acrylate and also 0.124% of 2,2'-bis(phenylethyl) thiocarbonate and 0.015% of azoisobutyronitrile (AIBN, Vazo 64™, DuPont) were used.

The average molecular weight and the polydispersity were determined by means of test B, the conversion by test A, and the gel index by test C.

Subsequently a swatch sample was produced by method B.

Example 3

Narrow $M_w$ Distribution; Low Molar Mass; UV Photoinitiator

A polymer was prepared by method A. 0.5% of acrylic acid, 49.5% of n-butyl acrylate, 49.5% of 2-ethylhexyl acrylate, 0.5% of benzoin acrylate and also 0.124% of 2,2'-bis(phenylethyl) thiocarbonate and 0.015% of azoisobutyronitrile (AIBN, Vazo 64™, DuPont) were used.

The average molecular weight and the polydispersity were determined by means of test B, the conversion by test A, and the gel index by test C.

Subsequently a swatch sample was produced by method B and was UV-irradiated by method C.

The specimen was tested in accordance with tests C, D and E.

Results

Table 1 below first of all assembles the results of the polymerizations:

TABLE 1

| Example | $M_w$ [g/mol] | Polydispersity PD | Conversion [%] | Roll temperature required for coating [° C.] |
|---|---|---|---|---|
| 1 | 2 380 000 | 6.1 | 72 | uncoatable |
| 2 | 593 000 | 3.4 | 67 | 120 |
| 3 | 487 000 | 3.6 | 60 | 110 |

$M_w$: average molecular weight from GPC
PD: $M_w/M_n$ = polydispersity from GPC Table 2 shows the results of the crosslinking and technical adhesive evaluation of the swatch specimens.

TABLE 2

| Example | Gel index [%] after polymerization | Gel index [%] after UV crosslinking | BS - steel [N/cm] | HP at RT [min] |
|---|---|---|---|---|
| 1 | 0 | 0 | | |
| 2 | 0 | 48 | 5.2 | >10 000 |
| 3 | 0 | 46 | 4.5 | 2780 |

HP: Holding Power
RT: Room Temperature
BS: Bond Strength

Example 1 serves as a reference example. For the method of the invention, examples 2 to 3 are attached. In examples 2 to 3, acrylate PSAs were produced with copolymerized photoinitiator and with a low molar mass. Through the use of a regulator, polymers were obtained which had a narrow-distribution molecular weight distribution.

The advantages of the method of the invention become clear on viewing the coatability of the acrylate composition. Example 1 is very high molecular weight and cannot be coated. Through the use of the regulator in the case of example 2 and 3 the molecular weight is lowered to an extent such that coating, which is necessary for application in the adhesive tape, is possible. Thus example 2, with an Mw of 593 000 g/mol, is coatable at 120° C., and example 3, with a lower Mw of 487 000 g/mol, is coatable at just 110° C. By virtue of the method of the invention it becomes possible to process the adhesive produced at a low coating temperature. Hence it is possible for completely solvent-free production of the adhesive tapes to take place.

For the efficiency of UV crosslinking the gel index is a decisive criterion. From table 2 it is evident that the use of a copolymerizable photoinitiator leads to crosslinking. Thus the composition from example 1, in which no copolymerizable photoinitiator was used, cannot be crosslinked by UV radiation. If, however, as in example 2 and 3, a photoinitiator is copolymerized, efficient crosslinking takes place by UV radiation. This leads to a good shear strength in the swatch specimens produced, in conjunction with a high bond strength to steel.

The examples therefore demonstrate that with the inventive method it is possible to produce solvent-free UV-crosslinkable acrylate PSAs. With the method of the invention it is possible, as a result of solvent-free production, to produce adhesive tapes which are notable for good cohesion, since they are UV-crosslinkable. The method allows high coating speed (>>100 m/min) and, at the same time, good crosslinkability, with a fast belt speed as well. Crosslinking can take place by means of a modular UV section, 6 medium-pressure Hg 200 W/cm lamps, at 200 m/min. In application, therefore, the method is particularly suitable for producing industrial adhesive tapes.

We claim:

1. A method for producing a UV-crosslinkable polyacrylate pressure-sensitive adhesive composition, the method comprising:
hydraulically filling a reactor of a planetary roller extruder with a reaction mixture for producing the polyacrylate pressure-sensitive adhesive composition, wherein the planetary roller extruder comprises a plurality of roller barrels in series wherein the polyacrylate pressure-sensitive adhesive composition comprises a polyacrylate having copolymerized photoinitiator units, an average molecular weight $M_w$ (weight average) of 100 000 to 3 000 000 g/mol, and being produced by a free-radical solvent-free polymerization conducted in the reactor of the hydraulically filled planetary roller extruder wherein a hole is located in a connecting flange between the roller barrels of the planetary roller extruder, and adding further substances, selected from the group consisting of initiators, monomers and polymerization regulators, along a length of the reactor via the hole located in the connecting flange.

2. The method of claim 1, wherein said polymerization takes place continuously.

3. The method of claim 1, wherein further substances selected from the group consisting of initiators, monomers, copolymerizable photoinitiators, and polymerization regulators are added downstream of the extruder.

4. The method of claim 1, wherein the polymerization is followed by devolatilization.

5. The method of claim 1, wherein, following polymerization and, optionally, subsequent devolatilization, the polyacrylate pressure-sensitive adhesive composition is coated from the melt onto a carrier.

6. The method of claim 5, wherein the polyacrylate is crosslinked by UV radiation and the UV crosslinking is assisted by an added polymerization regulator.

7. The method of claim 6, wherein, before and/or during the polymerization, thermally decomposing, free-radical-forming initiators are added.

8. The method of claim 6, wherein said polyacrylate is crosslinked after coating onto a carrier.

9. The method of claim 7, wherein said initiators are azo initiators and/or peroxo initiators.

10. The method of claim 1, wherein a valve is located at an exit of the reactor of the planetary roller extruder and adapted for hydraulically filling the reactor with the reaction mixture.

11. The method of claim 1, wherein oxygen-free conditions are present within the planetary roller extruder after hydraulic filling of the reactor of the planetary roller extruder with the reaction mixture.

12. The method according to claim 1, wherein the plurality of roller barrels in series consists of three roller barrels in series.

13. The method according to claim 1, wherein the reaction mixture comprises at least one monomer, at least one photoinitiator and at least one polymerization regulator.

* * * * *